No. 652,283. Patented June 26, 1900.
W. B. MESSER.
CANNING BASKET AND PAN.
(Application filed June 3, 1899.)
(No Model.)
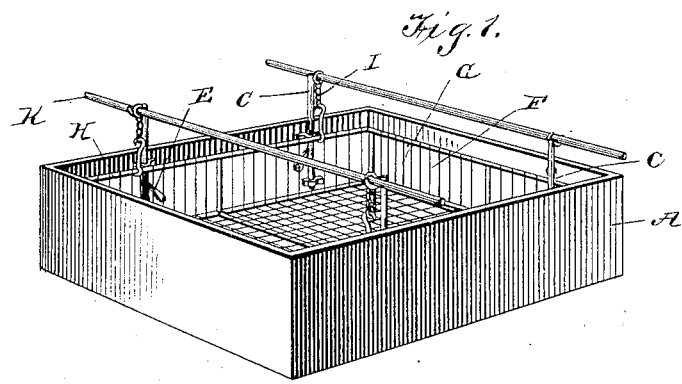
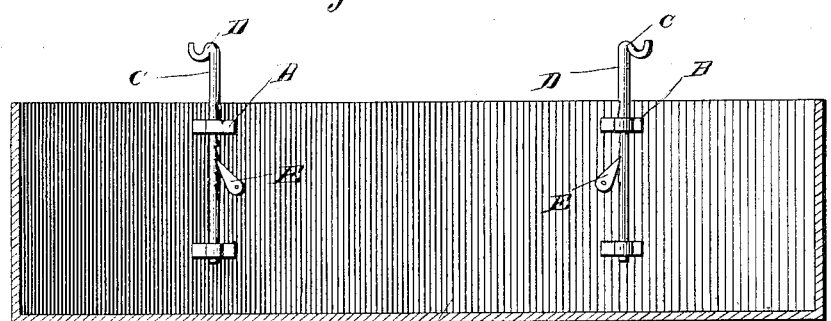
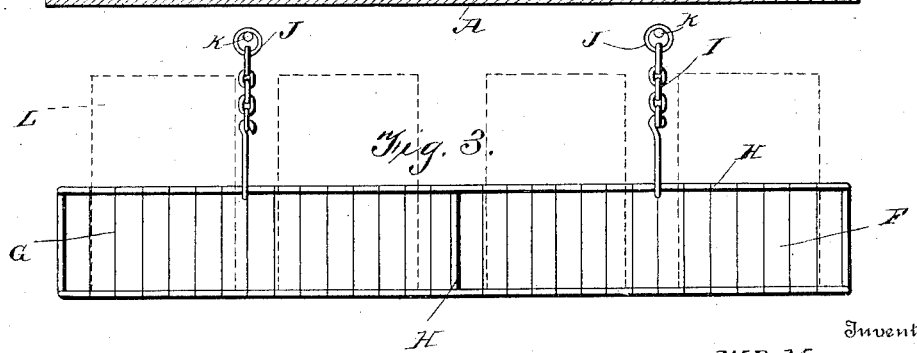
Witnesses
Inventor
W. B. Messer.

UNITED STATES PATENT OFFICE.

WILLIAM BRYANT MESSER, OF FELIX, MISSISSIPPI.

CANNING BASKET AND PAN.

SPECIFICATION forming part of Letters Patent No. 652,283, dated June 26, 1900.

Application filed June 3, 1899. Serial No. 719,278. (No model.)

*To all whom it may concern:*

Be it known that I, WILLIAM BRYANT MESSER, a citizen of the United States, residing at Felix, in the county of Marion and State of Mississippi, have invented a new and useful Canning Basket and Pan, of which the following is a specification.

My invention has relation to outfits for processing cans of fruit, vegetables, &c., the object of the invention being to provide a cheap, strong, handy, and serviceable outfit for such purposes comprising a skeleton basket for holding the cans during the processing, a pan for receiving the basket with the cans therein, and improved means for supporting and handling the basket.

With this object in view my invention consists in the improved construction, arrangement, and combination of parts hereinafter fully described and afterward specifically pointed out in the appended claim.

In order to enable others skilled in the art to which my invention most nearly appertains to make and use the same, I will now proceed to describe its construction and operation, reference being had to the accompanying drawings, forming part hereof, in which—

Figure 1 is a perspective view of my improved outfit complete. Fig. 2 is a vertical sectional view of the pan detached. Fig. 3 is a view of the basket detached, in side elevation, with filled cans therein, in dotted lines, and the chains and handles in place.

Like letters of reference mark the same parts in all of the figures of the drawings.

Referring to the drawings by letters, A indicates a pan, preferably rectangular and of sheet metal, adapted to contain boiling water in which to process the filled cans. On two opposite inner sides of the basket, slidably mounted in brackets B, are upright notched bars C, having their upper ends formed into hooks D and supported at any suitable heights by pawls E, pivoted to the sides of the pan and engaging the notches of the upright bars.

F indicates the pan, made of a shape to enable it to be placed in the pan A and made of wire G, supported on a framework H of metal bars. To the edges of two opposite sides of the basket are attached chains I, provided at their free ends with rings J.

K indicates a straight bar-handle for lifting the basket and cans L in place in the basket.

In the practical operation of my invention the basket is filled with filled cans and placed in the pan, which will be in position on a suitable stove or furnace and partially filled with boiling water. When the basket is in place in the pan, the rings J will be upon the handle-bars within the hooks D of bars C, and the basket will thus be suspended out of contact with the bottom of the pan, the upright bars having been previously adjusted to the proper height and secured at such height by the pawls E. When it is desired to remove the basket from the pan, the handle-bars K are lifted out of the hooks D and raised until the bottom of the basket will swing clear of the ends of the pan or the tops of the bars, as the case may be, and then the basket is removed to one side and placed where desired.

My invention as thus described provides a cheap, handy, strong, and serviceable outfit for farmers, housekeepers, and others, it being capable of use upon any ordinary stove or range, although I propose to furnish with the outfit a suitable, cheap, and portable furnace and to sell the pans, baskets, and furnaces separately, if needed.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

In a canning outfit the combination with an outer pan, two of the opposite sides of which are provided with two pairs of sockets, of a rod in each pair of sockets, one side of which is provided with notches and the upper end is bent into a hook, a pawl pivotally secured to the side of the pan between each pair of sockets, the free end of which is in position to engage with the notches in one of the rods, two handle-bars in said hooks, a skeleton pan within the outer pan, and flexible connectors on the pan, the free end of each of which is provided with a ring, said rings engaging with the handle-bars adjacent to the hooks, substantially as shown and described.

WILLIAM BRYANT MESSER.

Witnesses:
WM. W. TAYLOR,
W. J. HATTEN.